Patented July 21, 1936

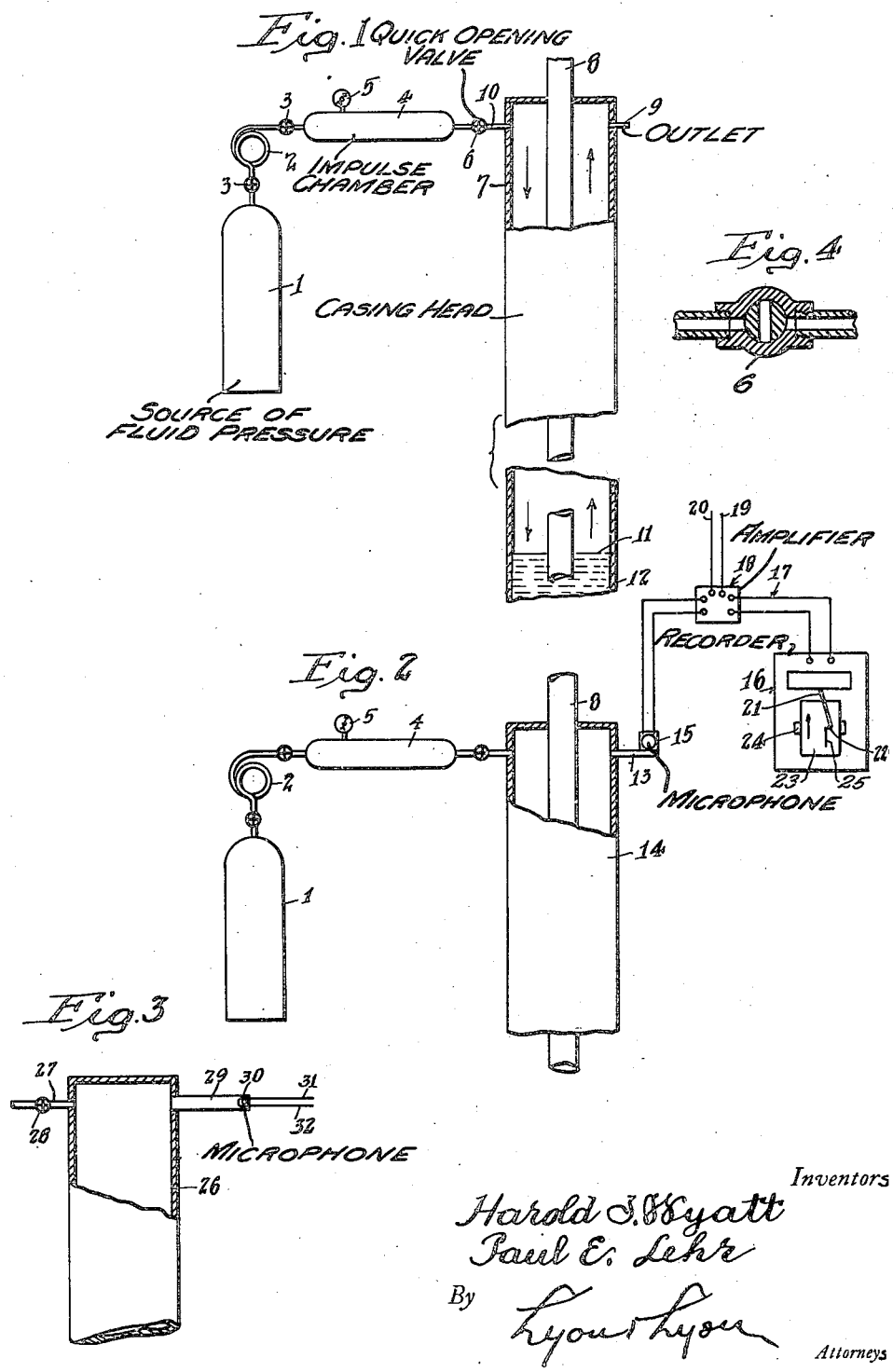

2,047,974

UNITED STATES PATENT OFFICE 2,047,974

METHOD AND APPARATUS FOR MEASURING WELL DEPTHS

Paul E. Lehr and Harold T. Wyatt, Long Beach, Calif.

Application November 1, 1933, Serial No. 696,290

9 Claims. (Cl. 177—352)

This invention relates to a method and apparatus for measuring distances and while the invention may be employed for different specific purposes, it is intended to be used particularly for measuring the depth of deep wells.

The usual method of measuring a well depth is by means of a sand line or a similar line let down into the well. This consumes considerable time and labor.

It has been attempted to measure the depth of wells by using a sound wave method in accordance with which a sound is made at the mouth of the well and then the elapsed time is measured for this sound wave to pass to the bottom of the well and be reflected back to the mouth of the well. The sound wave method operates more perfectly in theory than in practice for the reason that there is really very little energy in a sound wave and in deep wells this energy becomes so dissipated that the recording of the elapsed time becomes difficult. In using the sound method referred to, perhaps the crookedness of the well hole has considerable to do with the dissipation of the energy of the sound, causing considerable reflection and partial absorption of the sound waves as they pass down the well and return.

The general object of this invention is to provide a simple method and simple apparatus for ascertaining the distance to a distant surface from a local point, and particularly the distance from a well head to the liquid surface at the bottom of the well. It is frequently desirable during operations to ascertain the depth of the well measured to the surface of the liquid at its bottom and it is also frequently necessary to have this information in connection with pumping wells. The present method and apparatus affords means for determining well depths without the use of a sand line, and saving considerable labor; and without the use of a "sound method" which is more or less unreliable.

The invention may be practiced to advantage in shut down fields where it is important that a systematic series of fluid level observations be taken in order to locate those wells where the casing has failed and allowed water to enter.

Further objects of the invention will appear hereinafter.

As regards the apparatus, the invention consists in the novel parts and combination of parts to be described hereinafter, all of which contribute to produce an efficient apparatus for measuring well depths.

As regards the method, the invention consists in those novel steps and combinations of steps to be described hereinafter, all of which contribute to produce an efficient method for measuring well depths.

A preferred embodiment of the invention is described in the following specification, while the broad scope of the invention is pointed out in the appended claims.

In the drawing:

Figure 1 is a diagrammatic view illustrating a simple form of apparatus which may be employed in practicing the invention. This view shows some of the apparatus in side elevation and shows a portion of a well casing partly in elevation and partly in section, with certain parts broken away;

Figure 2 is a view similar to Figure 1 but illustrating indicating or recording apparatus for producing a record of the elapsed time in making the test;

Figure 3 is a view similar to Figure 2 but illustrating simple apparatus for enabling the invention to be practiced where the well is under pressure;

Figure 4 is a longitudinal section through a quick opening valve or cock which may be of conventional type and which is employed in connection with the invention.

Before proceeding to a detail description of this invention, it should be stated that it employs the impulse wave principle, and the impulse wave is not generated by sound, but is generated by causing a sudden change in pressure at the well head. This change in pressure may be occasioned by a sudden liberation of a sufficient quantity of gas at the well mouth to cause a sudden substantial increase of pressure or a sudden decrease of static pressure within the well head, and it may be accomplished so that only a slight change in pressure at the local point results. In either case this produces a pressure impulse wave immediately at the well head; and the elapsed time is observed for this wave to traverse the space from the local point or well head, to an obstruction such as liquid in the well, and return to the well head. If the well is not under pressure, we prefer to employ a confined quantity of fluid, preferably gas, and suddenly liberate a small quantity of it into the well head.

If the well has considerable pressure in it, as frequently exists in gas wells, the invention can be practiced by allowing a quantity of gas at the well head to escape suddenly into the atmosphere. If this is done, an expansion wave immediately originates at the well head, passes down to the surface of the liquid at the well bottom, and then travels up to the well head.

The elapsed time may be observed or indicated in any desired manner. If it is not desired to employ indicating instruments or recording instruments, a simple outlet can be provided at the well head, and a quantity of gas or air under pressure admitted suddenly into the well head, will, after a sufficient lapse of time, cause a perceptible puff of air or gas at the outlet. The elapsed time from the instant of admitting the gas or air under pressure until the occurrence of the puff at the outlet, will be the time consumed for the impulse wave to travel down and return from the bottom of the well. Such an impulse wave travels at the same velocity as sound, and if the elapsed time has been observed, it is possible, by employing a simple formula, to compute the depth of the well.

Referring more particularly to the parts and especially to Figure 1, 1 indicates a reservoir for any gas, for example, air, under considerable pressure, and this reservoir is connected through a suitable connection 2 with the valves 3, to an impulse chamber 4, being provided with a gauge 5 for indicating its internal pressure. The other end of this impulse chamber is connected through a quick opening valve or cock 6 to the well head or casing head 7. A flow pipe 8 may extend up through this casing head.

At any point on the periphery of the casing head an outlet 9 is provided to the atmosphere.

The valve 6 may be mounted in a pipe connection 10 which can be readily connected to the side of the casing.

In using the apparatus, the valve 6 should be closed and the valves 3 opened to permit a quantity of the compressed air or gas to accumulate in the impulse chamber 4, for example, at a pressure of one hundred pounds per square inch. The valves 3 would then be closed.

In making the test for determining the well depth, the valve 6 would be suddenly opened, thereby permitting a quantity of the compressed air or gas in the chamber to flow into the well head. This will produce an impulse wave which would pass downwardly as indicated by the arrows at the left side of the casing and this wave would eventually impinge upon the surface 11 at the well bottom 12 and would be reflected back toward the head of the well. When the impulse wave, after its reflection by the surface 11, arrives at the well head, a perceptible puff of the air or gas will occur at the outlet 9. This puff can be felt readily simply by holding one's hand in front of the outlet. At the instant that the valve 6 is opened a stop watch is started, and at the instant that the puff is felt at the outlet 9, the stop watch is stopped. The elapsed time will be the time required for the impulse wave to traverse the space from the local point at the well head to the surface 11, and return.

The velocity of this impulse wave will be substantially the same as that of a sound wave and can be computed by the following formula:

$$\text{Velocity} = \sqrt{\frac{Cp}{Cv} \times \frac{P}{D}}$$

In this formula $Cp$ equals the specific heat of the gas or air at constant pressure and $Cv$ equals the specific heat of the gas or air at constant volume. The pressure $P$ is usually expressed in pounds per square ft., and the density $D$ of the gas would be expressed in pounds mass per cubic ft. This will express the velocity in feet per second.

From this formula it is evident that the velocity of the impulse wave is independent of the pressure, for the reason that when the pressure is increased the density is also increased in the same proportion. If very accurate results are necessary, correction for temperature changes may be made according to well-known formulas.

If it is desired to have the result of the test indicated or recorded, this can be accomplished by providing a small pipe connection 13 (see Figure 2) which is attached to the casing 14 instead of the outlet 9, and this connection may carry a microphone 15 which is electrically connected with an indicating or recording instrument 16. If desired, the circuit connection 17 between the microphone and the indicator or recorder 16 may include an amplifier 18 connected to conductors 19 and 20 of an electric power circuit.

The recorder 16 illustrated may be provided with a pen arm 21 which would be controlled by an impulse in the circuit 17, and this pen arm would carry a pen or pencil 22 to run on the face of a recording drum 23 mounted to rotate on its horizontal axis in bearings 24.

This recording drum would be rotated at a uniform speed when the test was started, and the pen 22 would run in a straight line 25 on the drum and produce a laterally disposed peak in the line when the test started, and when the test ended by the return of the impulse wave from the bottom of the well. The test would be made in the same manner as that described in connection with Figure 1, and the apparatus used would be the same as illustrated at the left side of Figure 2.

If the well is under pressure, the invention can be practiced without the use of a high pressure gas, by merely permitting the quick exit of some of the gas in the well. This is illustrated in Figure 3 in which 26 indicates the well head which is provided at one side with a connection 27 carrying a quick opening valve or cock 28. The casing is provided with a pipe connection 29 carrying a microphone 30 with circuit wires 31 and 32 connecting it up to an amplifier and recording instrument. In practicing the invention, as illustrated in Figure 3, the sudden exit of a small quantity of gas under pressure from the interior of the head will cause an impulse wave to start from the well head, and thence to the liquid at the bottom of the well; this impulse will return, and the instant of arrival of this impulse wave at the well head 26 will be indicated by the microphone. The microphone and its connected indicating and recording instrument would also indicate the instant at which the valve 28 was open, thereby indicating the elapsed time. Hence, in using the formula in this case, also, it will be necessary to bear in mind that the impulse wave travels twice through the length or depth of the well.

In using the term "gas" in this specification and claims, it should be understood that the term, when used in its broad sense, is intended to include air which is, in fact, a gas.

It is understood that the embodiment of the invention described herein, is only one of the many embodiments this invention may take, and we do not wish to be limited in the practice of the invention, nor in the claims, to the particular embodiment set forth.

It is evident that our invention can be practiced also when the casing has atmospheric pressure within it or a partial vacuum, and with the same facility as when the well is under a high pressure.

What we claim is:—

1. A method of measuring the depth of a well having a casing head and casing, which consists in maintaining a confined supply of gas under pressure at the well head on the exterior of the casing, suddenly admitting a quantity of the said gas under pressure into the casing head and thereby producing a substantial change in static pressure and an impulse wave in the gas or air within the casing, and observing the elapsed time for the impulse wave to traverse the space from the casing head to the bottom of the well and back again to the casing head.

2. A method of measuring the depth of a well having a casing head and casing, which consists in confining a quantity of gas under pressure in the casing head, suddenly liberating a quantity of said gas and thereby suddenly reducing the static pressure in the casing head and producing an impulse wave in the gas within the casing, and observing the elapsed time for the impulse wave to traverse the space from the casing head to the well bottom and back to the casing head.

3. In apparatus for measuring the depth of a well, the combination of an impulse chamber carrying a gas maintained under pressure, a connection from the impulse chamber to the head of the well including a quick opening valve, said well having an outlet to the atmosphere, said parts cooperating so that when the valve is suddenly opened, a portion of the gas under pressure will pass into the well and thereby raise the static pressure of the gas at the head of the well to produce an impulse wave passing to the bottom of the well and reflected back to the head of the well, said impulse wave operating to produce a puff of gas at said outlet when the impulse wave arrives at the well head, thereby enabling the elapsed time during the wave's travel, to be observed.

4. In apparatus for measuring the depth of a well, the combination of an impulse chamber carrying a gas under pressure at the earth's surface, a connection from the impulse chamber to the head of the well including a quick opening valve, said well having an outlet to the atmosphere, said parts cooperating so that when the valve is suddenly opened, a portion of the gas under pressure will pass into the well and thereby cause an increase of static pressure in the gas in the well head, and produce an impulse wave passing to the bottom of the well and reflected back to the head of the well, and means for indicating the elapsed time for the wave to traverse the space to the well bottom and return.

5. In apparatus for measuring the depth of a closed well, the combination of an impulse chamber carrying a gas under pressure at the earth's surface, a connection from the impulse chamber to the head of the well including a quick opening valve, said parts cooperating so that when the valve is suddenly opened, a portion of the gas under pressure will pass into the well and thereby cause a rise in the static pressure in the well head, and produce an impulse wave passing to the bottom of the well and reflected back to the head of the well, and means connected with the well for indicating the elapsed time for the wave to traverse the space to the well bottom and return to the surface.

6. In apparatus for measuring the depth of a closed well, the combination of an impulse chamber carrying a gas under pressure, a connection from the impulse chamber to the interior of the well including a quick opening valve, said parts cooperating so that when the valve is suddenly opened, a portion of the gas under pressure will pass into the well and thereby cause a rise in the well head static pressure, and produce an impulse wave passing to the bottom of the well and reflected back to the head of the well, and a microphone connected with the well for indicating the instant the wave completes its travel within the well.

7. In apparatus for measuring the depth of a closed well, the combination of an impulse chamber carrying a gas under pressure, a connection from the impulse chamber to the interior of the well including a quick opening valve, said parts cooperating so that when the valve is suddenly opened, a portion of the gas under pressure will pass into the well and thereby raise the static pressure in the well head, and produce an impulse wave passing to the bottom of the well and reflected back to the head of the well, a microphone connected with the well, and a recording device electrically connected with the microphone.

8. In apparatus for measuring the depth of a closed well, the combination of an impulse chamber carrying a gas under pressure, a connection from the impulse chamber to the interior of the well including a quick opening valve, said parts cooperating so that when the valve is suddenly opened, a portion of the gas under pressure will pass into the well and thereby raise the static pressure in the well head, and produce an impulse wave passing to the bottom of the well and reflected back to the head of the well, a microphone connected with the well, an indicating device electrically connected with the microphone, and an amplifier between the microphone and the indicating device cooperating to indicate the elapsed time for the wave to traverse the space to the well bottom.

9. A method of measuring the distance to an obstruction or liquid in a well, which consists in maintaining a confined supply of gas under pressure at the well's mouth, suddenly liberating a quantity of the said gas under pressure at the well mouth and thereby producing a substantial change in static pressure and an impulse wave in the gas in the well, and observing the elapsed time for the impulse wave to traverse the space from the head of the well to the obstruction, and back again to the well's mouth.

HAROLD T. WYATT.
PAUL E. LEHR.